No. 657,218. Patented Sept. 4, 1900.
A. VON HOFFMANN.
SUBMARINE APPARATUS.
(Application filed Dec. 31, 1898.)

(No Model.) 4 Sheets—Sheet 1.

Witnesses:
Anton A. Hoetzner
J. H. Schott

Inventor:
August von Hoffmann
by Max Georgii
his Attorney

No. 657,218. Patented Sept. 4, 1900.
A. VON HOFFMANN.
SUBMARINE APPARATUS.
(Application filed Dec. 31, 1898.)
(No Model.) 4 Sheets—Sheet 2.
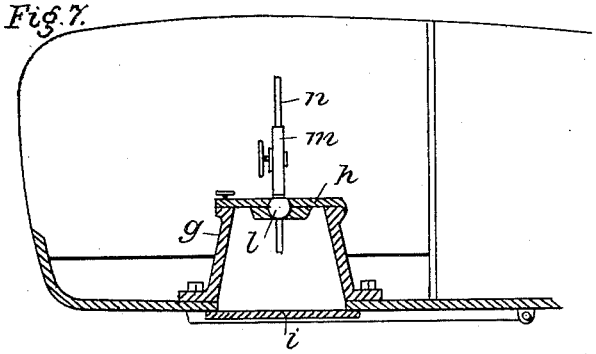
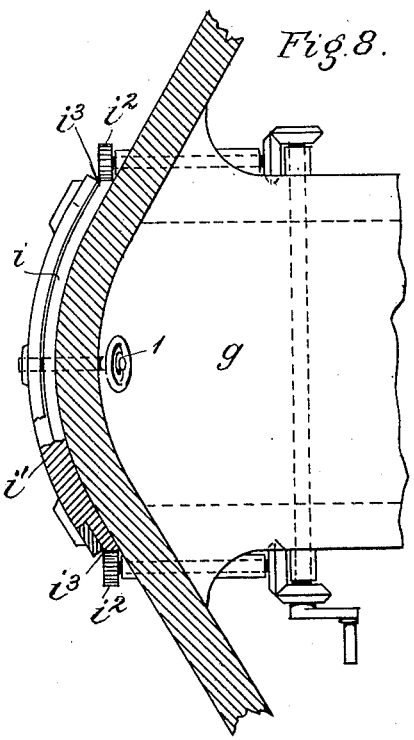
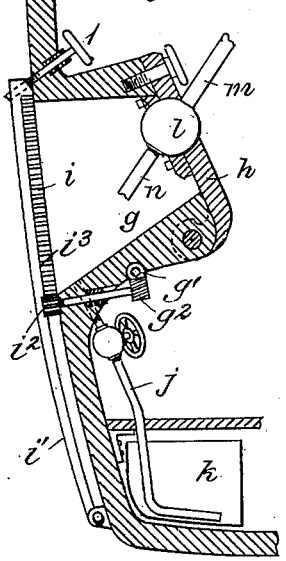
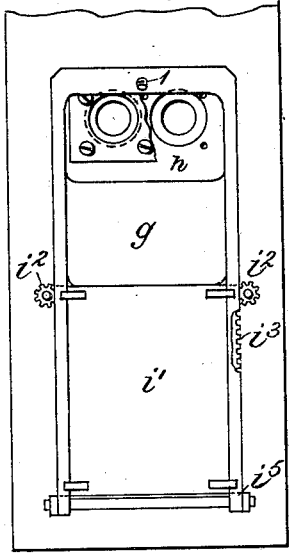
Witnesses:
Anton A. Lochner
F. H. Schott
Inventor
August von Hoffmann
by Max Georgii
his Attorney No. 657,218. Patented Sept. 4, 1900.
A. VON HOFFMANN.
SUBMARINE APPARATUS.
(Application filed Dec. 31, 1898.)
(No Model.) 4 Sheets—Sheet 3.
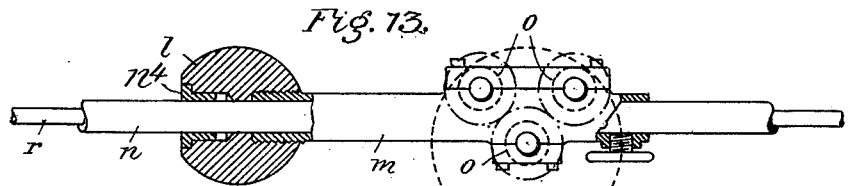
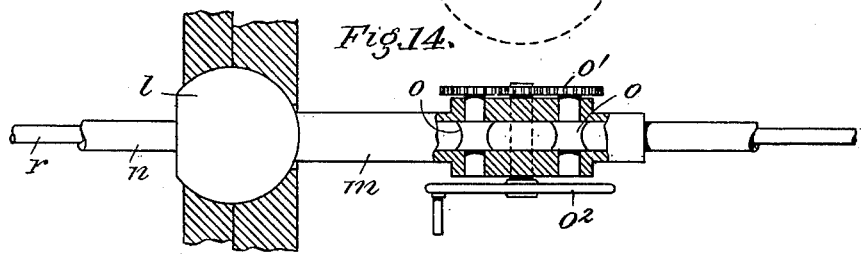
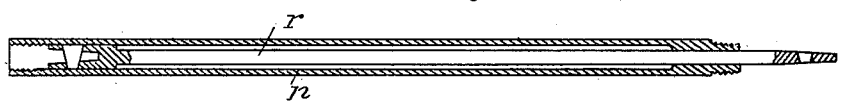
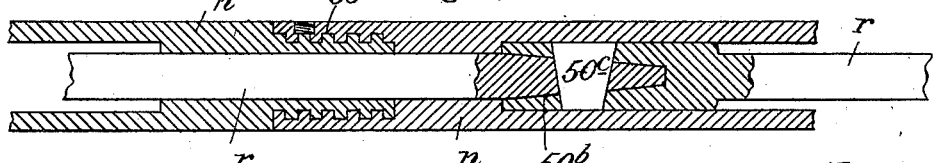

No. 657,218.  
A. VON HOFFMANN.  
SUBMARINE APPARATUS.  
(Application filed Dec. 31, 1898.)  
Patented Sept. 4, 1900.  
(No Model.) 4 Sheets—Sheet 4.
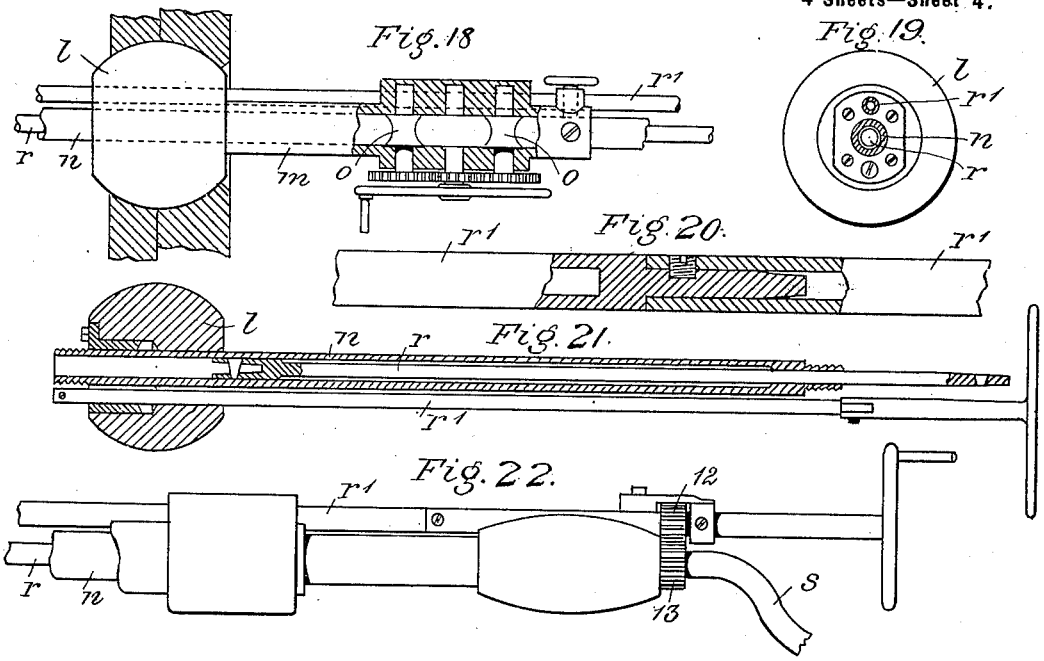

UNITED STATES PATENT OFFICE.

AUGUST VON HOFFMANN, OF MUNICH, GERMANY.

SUBMARINE APPARATUS.

SPECIFICATION forming part of Letters Patent No. 657,218, dated September 4, 1900.

Application filed December 31, 1898. Serial No. 700,821. (No model.)

*To all whom it may concern:*

Be it known that I, AUGUST VON HOFFMANN, a citizen of the Empire of Germany, residing at Munich, Germany, have invented certain new and useful Improvements in Submarine Apparatus; and I do hereby declare the following to be a full, clear, and exact description of the invention, such as will enable others skilled in the art to which it appertains to make and use the same.

This invention relates to apparatus for effecting or conducting various submarine operations; and it consists substantially in such features of improvement as will hereinafter be more particularly described.

The invention has for its object to provide suitable means in a submarine vessel whereby various kinds of tools or implements can be conveniently operated and manipulated from a water-tight compartment either for drilling or excavating at the bottom of rivers or the like or for cable repair, preparing sunken vessels to be raised, or for any and all similar purposes in which a drill, a clamp, a saw, or other device is required to be handled or set in motion while submerged in a body of water.

The above and additional objects are attained by the means illustrated in the accompanying drawings, in which—

Figure 1:
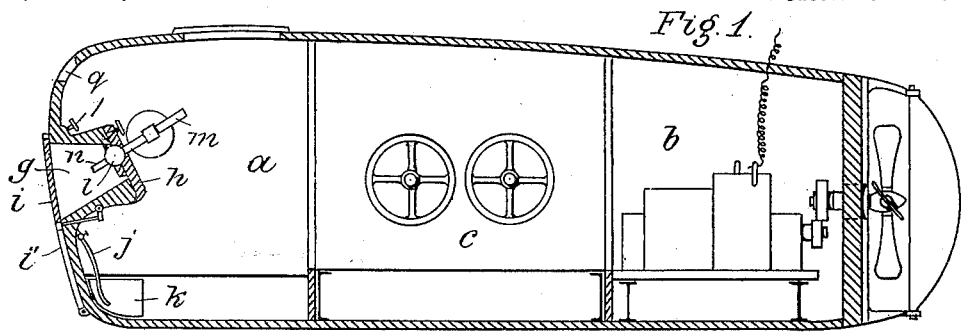
Figure 2:
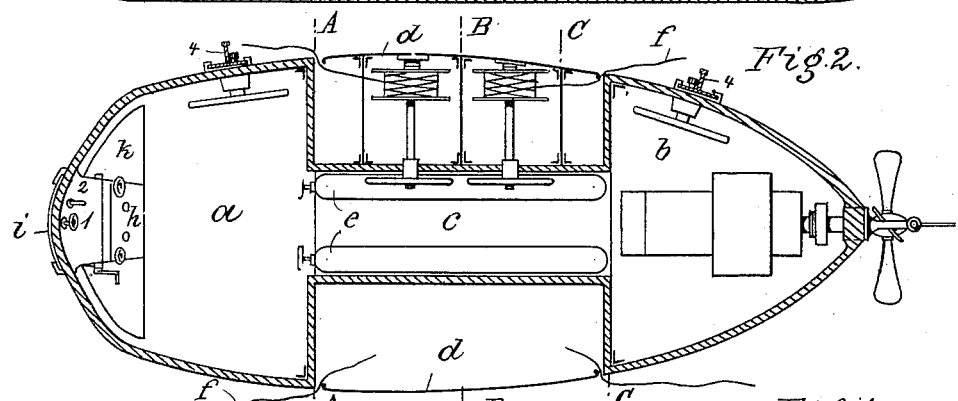
Figure 3:
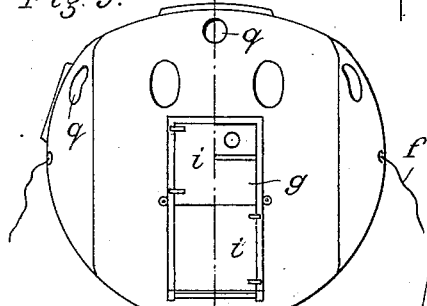
Figure 4:
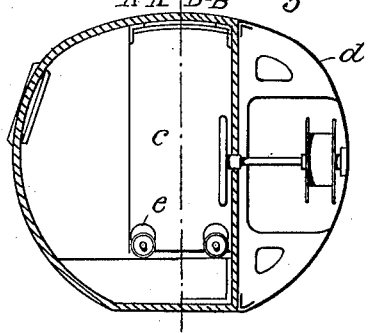
Figure 5:
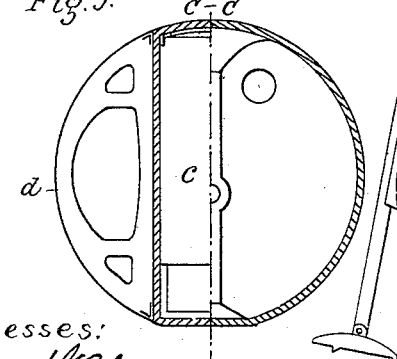
Figure 6:
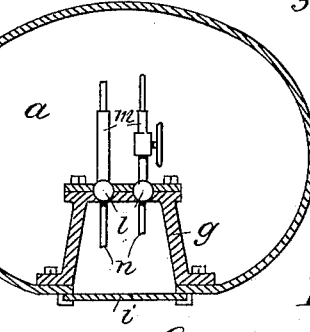

Figure 1 is a longitudinal sectional view of a submarine vessel showing the water-tight compartment at the bow of the vessel and also showing in reduced size the general arrangement of the appliances for directing the work of the operating tool or implement. Fig. 2 is a horizontal sectional view of Fig. 1. Fig. 3 is an end elevation. Fig. 4 is a transverse sectional view on the line A A, Fig. 2. Fig. 5 is a similar view taken on the line B B, Fig. 2. Fig. 6 is also a transverse sectional view on the line C C, Fig. 2, and also showing one of the side props or supports for the vessel. Fig. 7 is a sectional detail view showing the tool appliances in a different arrangement or position. Fig. 8 is an enlarged sectional view in detail to show more clearly the means for operating the door which closes the water-chamber pending the attachment and adjustment of the desired tool or implement to the operating tube or rod. Fig. 9 is an enlarged detail view in part section, showing the means for advancing and retracting the tool-carrying sleeve and also the means for raising or lowering the position of said tube in accordance with requirements. Fig. 10 is an enlarged sectional detail view of a part of the bow of the vessel and showing in section the water-chamber and the means for emptying the same whenever access thereto is required for the purpose of applying the necessary tool or implement to its carrying tube or rod, said view also showing the ball or universal joint forming the support for said tube or rod. Fig. 11 is a detail view. Fig. 12 is an end view of Fig. 10 and substantially an enlarged view of Fig. 3. Figs. 13 and 14, inclusive, are enlarged detail views of the means for advancing and retracting the tool-supporting tube in its joint or movable support. Figs. 15 to 17, inclusive, are enlarged detail views showing the means of joining and extending the lengths of the tool-supporting tube and operating-rod. Figs. 18 to 21, inclusive, are also enlarged detail views of other features of construction. Fig. 22 is a detail view showing the means for operating the auxiliary rod from the main tool-carrying rod.

Referring first to Figs. 1 to 4, $a$ denotes a working chamber of any suitable or desired form, which is represented in the present case as being in a submarine boat. In the forward end of this chamber is arranged a quadrangular casing $g$, which is adapted to communicate with the surrounding water by means of two opposite doors or ports $h\ i$. A cock or other valve 2 (shown in Figs. 2 and 11) serves to equalize the pressure within the casing $g$ and the surrounding water according to necessity. A pipe or channel $j$, provided with a cut-off cock, is arranged so as to connect the interior of the casing $g$ with a small water-reservoir $k$, arranged below the same. This arrangement is shown in Fig. 1 and on an enlarged scale in Fig. 12.

The holders for the submarine tools are mounted on two ball-joints $l$. (Represented in Fig. 1 and in detail and on an enlarged scale in Figs. 9 and 10.) These ball-joints are provided with central bores, serving to receive an accurately-calibered tube $n$, which is provided with water-tight packing $n^9$. (See Figs. 13 and 15.) This tool-carrying tube $n$ serves to hold the interchangeable tools and is adapted to be extended, thrust forward, and withdrawn at pleasure. A guide-sleeve $m$, which is firmly screwed into the ball-joint, (see Figs. 1, 9, 14, and in particular Fig. 13,) serves to carry within a housing, cast with or otherwise secured to the same, the means for advancing and operating the carrying-tube $n$, (see particularly Figs. 9, 13, and 14,) from which it appears that this advancing and actuating means comprises a series of friction-rolls $o$. These friction-rolls $o$, which are connected together by intermeshing gear wheels or cogs $o'$ (see Fig. 14) and which are pressed against the carrying-tube $n$ by springs, serve to advance or retract or withdraw the said carrying-tube, they being actuated for this purpose by means of a crank-wheel $o^2$, keyed or otherwise secured to the shaft on which one of the friction-rolls $o$ is mounted. The actuating device for the carrying-tube $n$ is, moreover, provided with a support $p$, (best shown in Fig. 9,) which support is adapted to be raised and lowered by means of a pinion $p'$, meshing with a rack $p^2$, with which the support $p$ is provided, said pinion being fixed to a spindle $p^3$, carrying a hand-wheel $p^4$ for turning said spindle and pinion for the purpose of raising and lowering the support $p$. The carrying-tube $n$ may be connected with the support $p$ in any way which will allow perfect freedom of movement and at the same time enable the support to hold the carrying-tube in the proper position.

The dimensions and distances within the submarine working chamber $a$ are established in such a way that an operator of normal size may be enabled to look through the windows $q$, arranged at the front and side walls of the forward portion of the chamber $a$, and at the same time manipulate the crank-wheel $o^2$ of the carrying-tube $n$ and the hand-wheel $p^4$, Fig. 9, the support $p$ with one hand, leaving his other hand free to grasp the handle of the tool-carrying tube $n$. The operator stands at the side of the apparatus leaning against the wall of the subaqueous chamber. The tools are screwed into the first member of the carrying-tube $n$, which is especially constructed for this purpose. They are held in their positions by any suitable keys or fastenings. An air-tight closure is furnished for this and the other members of the carrying-tube by stuffing-boxes. The carrying-tubes $n$ have cylindrical bores, and they carry cylindrical rods $r$, snugly fitting into the bores, the said rods $r$ being of suitable length and serving for actuating the tools.

In Figs. 15 and 16 are represented two extension-pieces for the carrying-tube $n$ and rod $r$, the method of connecting the extension and tube and rod being disclosed in detail in Fig. 17, which is drawn on a considerably-enlarged scale for this purpose. In said Fig. 17 the sections of the tube $n$ are threaded to fit each other, as shown at $50^a$, and the sections of the rod $r$ are united by a tapering socket-joint $50^b$ and a fastening key or wedge $50^c$.

When it is desired to secure the tools to the carrying-tube $n$ and rod $r$, the water from the closed casing $g$ is drained through the tube $j$ into the reservoir $k$. If the water rushes into the reservoir violently and excessively, this indicates that the outer door is not packed sufficiently tight. This defect is remedied by tightening the hand-screw $l$. (Best shown in Figs. 1, 2, 8, and 11.) The inner door $h$ is then unlocked by turning suitable hand-screws and thrown back or open. By this operation the outer ends of the carrying-tube $n$ and rod $r$, which are mounted in the door $h$, are exposed and rendered accessible. The required tools are now screwed or otherwise secured to the said outer ends of the rod and carrying-tube, and the door $h$ is closed and securely locked in the position indicated in Figs. 1 and 10, for example. The casing $g$ is now again filled with water by pumping the same from the reservoir $k$, the valve or cock (shown in Fig. 13) having first been opened. If any water should escape into the working chamber $a$, this indicates a defective packing of the inner door $h$. If this is the case, the packing must of course be made sufficiently tight so as to avoid any leakage. The casing $g$ having been filled with water and the door $h$ having been tightly packed and locked in position, the outer door $i$ is released by reverse rotation of the hand-screw $l$, which in connection with the hinged frame $i'$ holds the door $i$ tightly against the forward opening of the casing $g$, when the screw $l$ is tightened. The door $i$ may now be lowered by means of pinions $i^2$, engaging with racks $i^3$, on the sides of the door, as best shown in Figs. 8, 10, and 12. These pinions $i^2$ are actuated by a crank actuating a train of beveled wheels and shafts, as shown in Fig. 8.

Instead of the beveled gearing I may employ a worm or worm-gear connections $g'$ $g^2$, as shown in Fig 10.

In Fig. 12 the form of the hinged door-supporting frame $i'$ is best shown, the hinge being indicated at $i^5$. It will be noted from this figure that the frame, in connection with the pinions, affords an effective guide for the door $i$ without at all interfering with the forward opening of the casing $g$.

It is manifest that before the door is opened the apparatus will have been brought into the proper position for operating at the points desired and properly anchored.

If, as sometimes may be required, it is desired to fit the apparatus to operate downwardly in a vertical direction instead of forwardly, as heretofore described, the arrangement of the working chamber $a$ is slightly modified and the casing $g$ arranged at the bottom of the chamber $a$, as illustrated in Figs. 6 and 7. The carrying-tube $n$ and the operating-rod $r$ are then mounted so as to be extensible in a vertical downward direction, the apparatus being the same as that hereinabove described in all other respects.

Having thus fully described my invention, what I claim as new, and desire to secure by Letters Patent of the United States, is—

1. A submarine vessel provided with a working compartment having a chamber adapted for communication with the surrounding water, a universal support for a wrecking-tool or other device mounted in said chamber, a tank, and water connections between the tank and chamber.

2. A submarine vessel provided with a working compartment having a chamber, a door closing the chamber from the surrounding water, a door also closing the chamber from said compartment, a tank, and water connections between the tank and the said chamber.

3. A submarine vessel provided with a working compartment having a chamber, a door closing the chamber from the surrounding water, a hinged door closing the chamber from the compartment, and a universal support for a wrecking-tool or other device mounted in said latter door.

4. A submarine vessel provided with a working compartment having a chamber setting in from the wall thereof, means for closing the chamber from the working compartment, a sliding door for closing the chamber from the surrounding water, a frame for guiding the sliding door and means for clamping the said frame against the vessel to secure the door tightly against the side of the vessel.

5. A submarine vessel provided with a working compartment having a chamber setting in from the wall thereof, means for closing the chamber from the working compartment, a sliding door for closing the chamber from the surrounding water, a frame hinged to the outside of the vessel for guiding the sliding door, and a screw projecting through the vessel and engaging the free end of the hinged frame to cause the frame to tightly secure the sliding door against the side of the vessel, substantially as set forth.

6. A submarine vessel provided with a working compartment having a chamber, a door closing the chamber from the surrounding water, a door closing the chamber from the compartment, a universal support for a wrecking-tool or other device mounted in said latter door, and a rotatable longitudinally-movable tube held in said support.

7. A submarine vessel provided with a working compartment having a chamber, a door closing the chamber from the surrounding water, a door closing the chamber from the compartment, a universal support for a wrecking or other implement mounted in the latter door, a rotatable longitudinally-movable tube held in said support, and a rotatable longitudinally-movable rod supported in the tube.

8. A submarine vessel provided with a working compartment having a chamber, a door closing the chamber from the surrounding water, a door closing the chamber from the compartment, a universal support for a wrecking or other implement mounted in said latter door, a rotatable longitudinally-movable tube held in said support, a rotatable longitudinally-movable rod in the tube, and means on the tube for operating the rod.

9. A submarine vessel provided with a working compartment having a chamber, a door closing the chamber from the surrounding water, a door closing the chamber from the compartment, a universal support for a working implement mounted in the latter door, a rotatable longitudinally-movable implement-holder working in said support, and means for elevating and lowering the position of said holder.

10. A submarine vessel provided with a working compartment having a chamber setting in from the wall thereof, a door closing the chamber from the surrounding water, a door closing the chamber from the compartment, a universal support for a working implement mounted in the latter door, a rotatable longitudinally-movable implement-holder working in said support, and a rack and pinion for elevating and lowering the position of said holder.

In testimony whereof I affix my signature in presence of two witnesses.

AUGUST VON HOFFMANN.

Witnesses:
 EMIL HENZEL,
 BABETTE BREHM.